(12) United States Patent
Li

(10) Patent No.: US 7,620,060 B2
(45) Date of Patent: Nov. 17, 2009

(54) METHOD FOR AUTOMATICALLY CONFIGURING TERMINAL EQUIPMENT

(75) Inventor: Jie Li, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 589 days.

(21) Appl. No.: 11/544,096

(22) Filed: Oct. 5, 2006

(65) Prior Publication Data

US 2007/0094362 A1 Apr. 26, 2007

Related U.S. Application Data

(63) Continuation of application No. PCT/CN2005/001037, filed on Jul. 13, 2005.

(30) Foreign Application Priority Data

Jul. 13, 2004 (CN) ......................... 2004 1 0071739

(51) Int. Cl.
    *H04L 12/56* (2006.01)
    *H04L 12/28* (2006.01)
    *H04J 3/12* (2006.01)

(52) U.S. Cl. ........................ 370/420; 370/352; 370/389; 370/487; 370/522; 375/468

(58) Field of Classification Search ......... 370/352–359, 370/389, 410, 413–424, 522, 466; 375/144, 375/267, 468; 455/186.1; 705/17; 709/220
    See application file for complete search history.

(56) References Cited

U.S. PATENT DOCUMENTS 4,878,216 A * 10/1989 Yunoki ....................... 370/389

| 6,128,293 | A  | * | 10/2000 | Pfeffer ...................... 370/359 |
| 7,050,454 | B1 | * | 5/2006 | Dzuban et al. .............. 370/466 |
| 2003/0039268 | A1 | | 2/2003 | Chong et al. |
| 2003/0179763 | A1 | * | 9/2003 | Horiba ....................... 370/420 |
| 2004/0128201 | A1 | | 7/2004 | Ofir et al. ..................... 705/17 |

FOREIGN PATENT DOCUMENTS

CN        1553630        12/2004

(Continued)

OTHER PUBLICATIONS

International Search Report for PCT/CN2005/001037, mailed Oct. 20, 2005.

(Continued)

*Primary Examiner*—Afsar M. Qureshi
(74) *Attorney, Agent, or Firm*—Marshall, Gerstein & Borun LLP

(57) ABSTRACT

A method for automatically configuring terminal equipment improves the performance of configuring and managing the terminal equipment. The method includes: after being powered on/reset, the terminal equipment reporting the current configuration information to the terminal management unit; the terminal management unit determining whether the configuration information reported by the terminal equipment is the same as the configuration information for the terminal equipment stored in the terminal management unit, if it is the same, terminating the current process, otherwise, transmitting the configuration information for the terminal equipment in the terminal management unit to the terminal equipment; the terminal equipment hence updating its own configuration information according to the received configuration information.

22 Claims, 2 Drawing Sheets

FOREIGN PATENT DOCUMENTS

EP  WO-01/31843  5/2001
WO  WO-00/39977  7/2000

OTHER PUBLICATIONS

Written Opinion for PCT/CN2005/001037, mailed Oct. 20, 2005.
European Search Report for Application No. EP 05 772 888.3-2416.
ETSI, "Transmission and Multiplexing (TM); Access Transmission Systems on Metallic Access Cables; Very High Speed Digital Subscriber Line (VDSL); Part 2: Transceiver Specification," ETSI TS 101 270-2 V1.2.1 (2003).
ITU-T G.994.1, "Handshake Procedures for Digital Subscriber Line (DSL) Transceivers," International Telecommunications Union (2003).
ITU-T G.997.1, "Physical Layer Management for Digital Subscriber Line (DSL) Transceivers," International Telecommunications Union (2003).
Supplementary European Search Report for Application No. EP 05 77 2888, dated May 21, 2007.

* cited by examiner

METHOD FOR AUTOMATICALLY CONFIGURING TERMINAL EQUIPMENT

CROSS-REFERENCES TO RELATED APPLICATIONS

This is a continuation of International Application No. PCT/CN2005/001037, which was filed on Jul. 13, 2005, and which, in turn, claimed the benefit of Chinese Patent Application No. 200410071739.8, which was filed on Jul. 13, 2004, the entire disclosures of which are hereby incorporated herein by reference.

BACKGROUND OF THE DISCLOSURE

1. Field of the Invention

The present invention relates to communication equipment configuration technique, and more particularly, to a method for automatically configuring terminal equipment.

2. Background of the Invention

The development of communication technology has been deeply affecting people's daily lives and social lives; especially the emergence of various broadband access techniques makes it convenient for more and more people in terms of work, life and entertainment.

At present, the conventional broadband access technique comprises: x Digital Subscriber Line (xDSL) access based on common telephone lines, Hybrid Fiber-Coaxial (HFC) access based on cable television coaxial cable and Local Area Network (LAN) access based on Ethernet technology. Besides, the broadband access technique based on Next Generation Network (NGN) is becoming more and more applicable. The common characteristic of the above-mentioned various broadband techniques is that a type of terminal equipment needs to be deployed at the user side so that devices like personal computers can be connected to the operator's network through the terminal equipment. For instance, in an Asymmetrical Digital Subscriber Loop (ADSL) access mode, an ADSL Transmitting/receiving Unit for Remote end (ATU_R) needs to be installed at the user side; in the HFC access mode, a Cable Modem (CM) needs to be installed at the user side; in the NGN-based network, an Integrated Access Device (IAD) needs to be deployed at the user side.

Taking the ADSL access technique for example, a network application model of ADSL is shown in FIG. 1. A Digital Subscriber Line Access Multiplexer (DSLAM) is set at a Central Office (CO) to provide a twisted-pair interface; and a terminal equipment ATU_R is set at the user side. The DSLAM and the ATU_R cooperate to implement the function of broadband access. Setting the terminal equipment at the user side is a step in the broadband access solution, which can implement specific functions. There are a great number of subscribers in the operator network, thus a great number of terminal equipment need to be set. Therefore, it is a great challenge for the operator to effectively maintain and manage such large number of terminal equipment that are extensively distributed.

At present, after setting the terminal equipment at the user side, the user terminal equipment needs to be configured before the broadband service is enabled. The configuration at the terminal equipment should be coordinated with the CO configuration, so that the service can be provided normally. The configuration at the terminal equipment usually comprises service information configuration, equipment information configuration and so on.

The current frequently used configuration measure is to manually configure the online terminal equipment through a terminal management unit. In other words, the manager of the terminal equipment inputs configuration information through a graphical or command line man-machine interaction interface; and then the terminal management unit directly transmits the inputted information to the terminal equipment to complete the configuration operation. The terminal management unit can be a network management system or an independent terminal management system. According to the measure of manually configuring the terminal equipment, the terminal equipment can be configured only when it is online. The term "online" refers to that the equipment is powered on and there is an available information channel between the equipment and the management tools. Because the terminal equipment is located at the user side, the terminal manager of the operator cannot control the terminal equipment to be online. It is sometimes impossible to complete configuring the terminal equipment through the manual online measure. Furthermore, it is of great workload, low efficiency and proneness to errors to configure the large number of user terminal equipment by using the manual online measure. Besides, it relies on whether the terminal equipment is correctly configured to enable the user service. Adopting manual online measure to configure the terminal equipment requires manual intervention, so it is unable to satisfy the requirement of the function of plug and play for the terminal equipment.

According to the solution of automatically configuring the terminal equipment in the prior art, the configuration information of the terminal equipment is stored in the server in the form of a file. On starting up, the terminal equipment automatically downloads the configuration file from the specified server to complete relevant configuration. According to the existing solution of automatic configuration, the terminal equipment needs to download the configuration file each time it is powered on, which leads to low efficiency. Furthermore the configuration file of all terminal equipment is the same, so individual configuration cannot be performed as demanded.

SUMMARY OF THE INVENTION

A method for automatically configuring terminal equipment, wherein a terminal management unit provides the terminal equipment with configuration information, including: after being powered on/reset, the terminal equipment reporting the current configuration information to the terminal management unit; the terminal management unit determining whether the configuration information reported by the terminal equipment is the same as the configuration information for the terminal equipment stored in the terminal management unit, if the configuration information reported by the terminal equipment is the same as the configuration information for the terminal equipment stored in the terminal management unit, terminating the current process, otherwise, transmitting the configuration information for the terminal equipment stored in the terminal management unit to the terminal equipment; and, the terminal equipment updating its own configuration information according to the received configuration information.

In accordance with the main idea of the embodiments of the present invention, the terminal equipment reports current configuration information; the terminal management unit determines whether the reported configuration information is the same as the stored configuration information to decide whether to transmit the configuration information once again. Moreover, a solution is provided to set up corresponding identifier for the configuration information and determine whether to transmit the configuration information once again according to the identifier.

According to the embodiments of the invention, it can be completed automatically to configure the terminal equipment, so that the efficiency of managing the terminal equipment is greatly improved and the operating and maintaining cost is reduced; the function of plug and play of the terminal equipment can be implemented; the failure, which is caused by the user making bold to modifying the configuration information of the terminal equipment, can be avoided; and individual configuring projects can be subscribed according to the type of the terminal equipment.

DETAILED DESCRIPTION OF PREFERRED EMBODIMENTS

Figure 1:
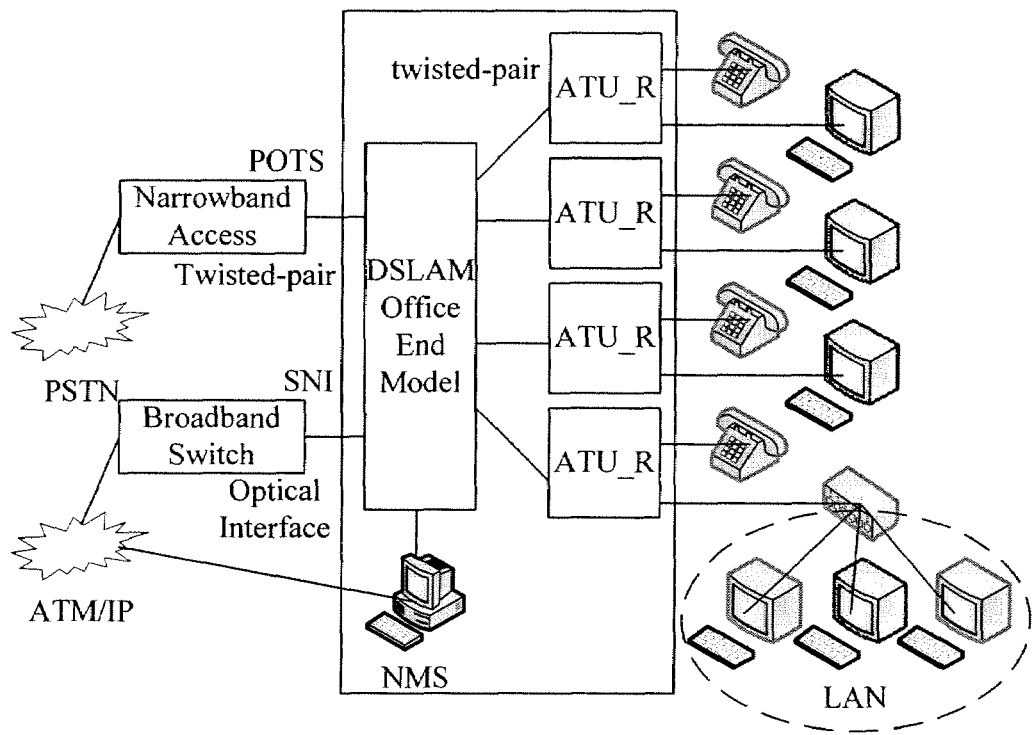
FIG. 1 is an ADSL broadband access network application model.
Figure 2:
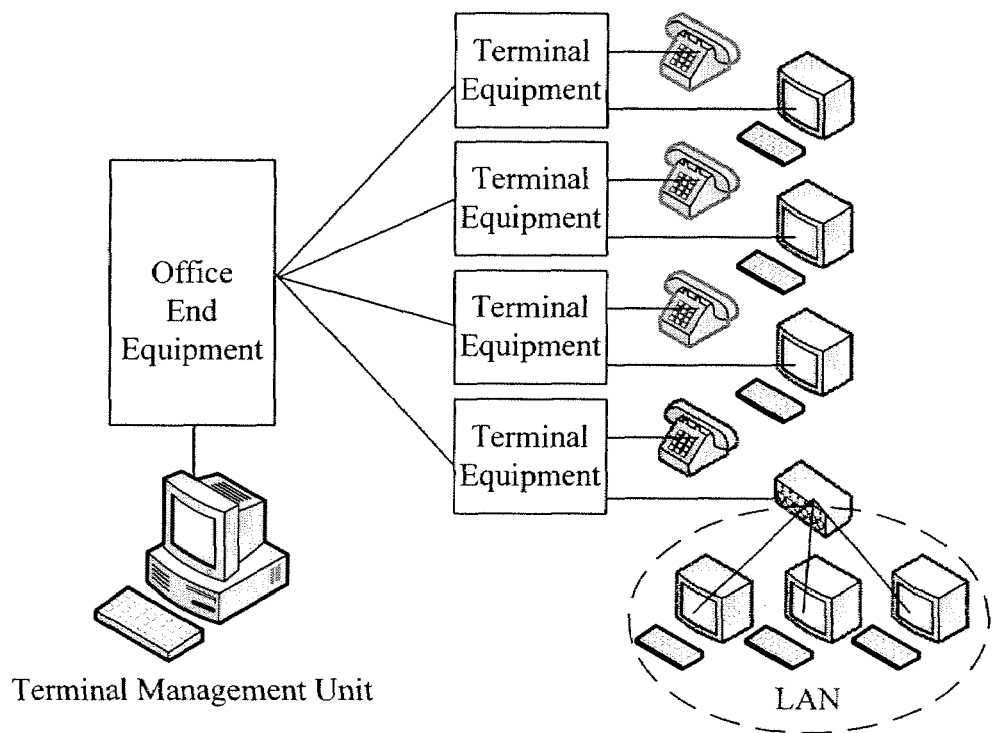
FIG. 2 is a schematic diagram of a system in accordance with the embodiment of the invention.

According to the solution of the present invention, configuration information for terminal equipment is provided by a terminal management unit; when the terminal equipment obtains the configuration information from the terminal management unit, the terminal management unit determines whether the configuration information in the terminal equipment is the same as the configuration information for the terminal equipment stored in the terminal management unit; if the configuration information in the terminal equipment is the same as the configuration information for the terminal equipment stored in the terminal management unit, the terminal management unit needn't transmit the configuration information to the terminal equipment, otherwise, the terminal management unit transmits the configuration information to the terminal equipment and the terminal equipment updates its configuration information according to the received configuration information. The configuration information provided by the terminal management unit is the same as the configuration information stored in the office end equipment, so the terminal equipment can connect the computer to the network through the office end equipment after completing the configuration.

Based on the solution in accordance with the embodiment of the invention, even if another equipment modifies the configuration information in the terminal equipment, after being powered on or reset, the terminal equipment can still replace its own configuration information with the configuration information in the terminal management unit by interacting with the terminal management unit.

The present invention will be described in detail hereinafter with reference to the accompanying drawings and the specific embodiments.

Firstly, the configuration information allocated for the terminal equipment is stored in the terminal management unit. The terminal management unit can set the same configuration information for all terminal equipment, so that the terminal management unit can directly transmit the configuration information to the terminal equipment according to specific demands. In order to enable the terminal equipment to perform individual configuration, the terminal management unit can also set configuration information corresponding to each terminal equipment, so that the terminal management unit needs to determine the configuration information corresponding to the terminal equipment before transmitting the configuration information to the terminal equipment.

Since the terminal management unit needs to determine whether the configuration information in the terminal equipment is the same as the configuration information provided by the terminal management unit, for the convenience of comparing, corresponding identifiers can be set for the configuration information in the terminal equipment and for the configuration information for the terminal equipment that is stored in the terminal management unit. In the embodiment, the identifier stored in the terminal management unit is called a second identifier while the identifier of the configuration in the terminal equipment is called a first identifier. The value of the first identifier in the terminal equipment before performing the configuration is called an initial value of the first identifier.

While setting the second identifier, if identical configuration information is configured in the terminal management unit for all terminal equipment, a second identifier will be set for all terminal equipment, i.e. the configuration information and the second identifier for all terminal equipment in the terminal management unit are the same. If corresponding configuration information is respectively configured for each terminal equipment, a second identifier will be set for each terminal equipment; of course, a second identifier can also be set for all terminal equipment in such a case.

The first identifier and the second identifier can be acquired according to the configuration information, e.g. by performing such calculations as checksum or Cyclic Redundancy Check (CRC) upon the configuration information and taking the obtained result as the identifier of the configuration information.

Obviously, if the terminal equipment has finished the configuration, the first identifier in the terminal equipment should be the same as the second identifier for the terminal equipment in the terminal management unit; if the configuration is not performed, the two identifiers should be different from each other.

In order to make sure that the first identifier and the second identifier are the same after the terminal equipment has been configured, after the configuration is completed, it is needed to unify the first identifier in the terminal equipment and the second identifier for the terminal equipment in the terminal management unit. Various measures can be adopted as long as the unification can be implemented.

For instance, when a corresponding second identifier is set up for each terminal equipment in the terminal management unit, a terminal equipment can transmit its first identifier to the terminal management unit and the terminal management unit will update its second identifier for the terminal equipment according to the first identifier value. The first identifier can be reported to the terminal management unit by the terminal equipment on its own initiative, or be obtained from the terminal equipment by the terminal management unit on its own initiative. The first identifier can be an original identifier of the terminal equipment, or be a identifier calculated by the terminal equipment according to the configuration information. Of course, it is necessary to make sure that the first identifier calculated by the terminal equipment according to the configuration information is different from the second identifier calculated by the terminal management unit. For example, the calculating parameter adopted by the terminal equipment can be set to be different from the calculating parameter adopted by the terminal management unit.

When a corresponding second identifier is set for each terminal equipment in the terminal management unit, the terminal management unit can also send its second identifier together with the configuration information to the terminal equipment, and then the terminal equipment updates its first identifier according to the second identifier.

When the terminal management unit allocates the same configuration information and the same identifier for all terminal equipment, the first identifier and the second identifier can only be unified through the above-mentioned solution, according to which the terminal management unit sends the second identifier to the terminal equipment and then the terminal equipment updates its first identifier accordingly.

In order to make sure that, before the terminal equipment is configured, the initial value of first identifier of the terminal equipment is different from the second identifier for the terminal equipment stored in the terminal management unit, if the terminal management unit finds that the value of the second identifier for the terminal equipment is the same as the initial value of the first identifier, the second identifier should be modified into another value.

Figure 3:
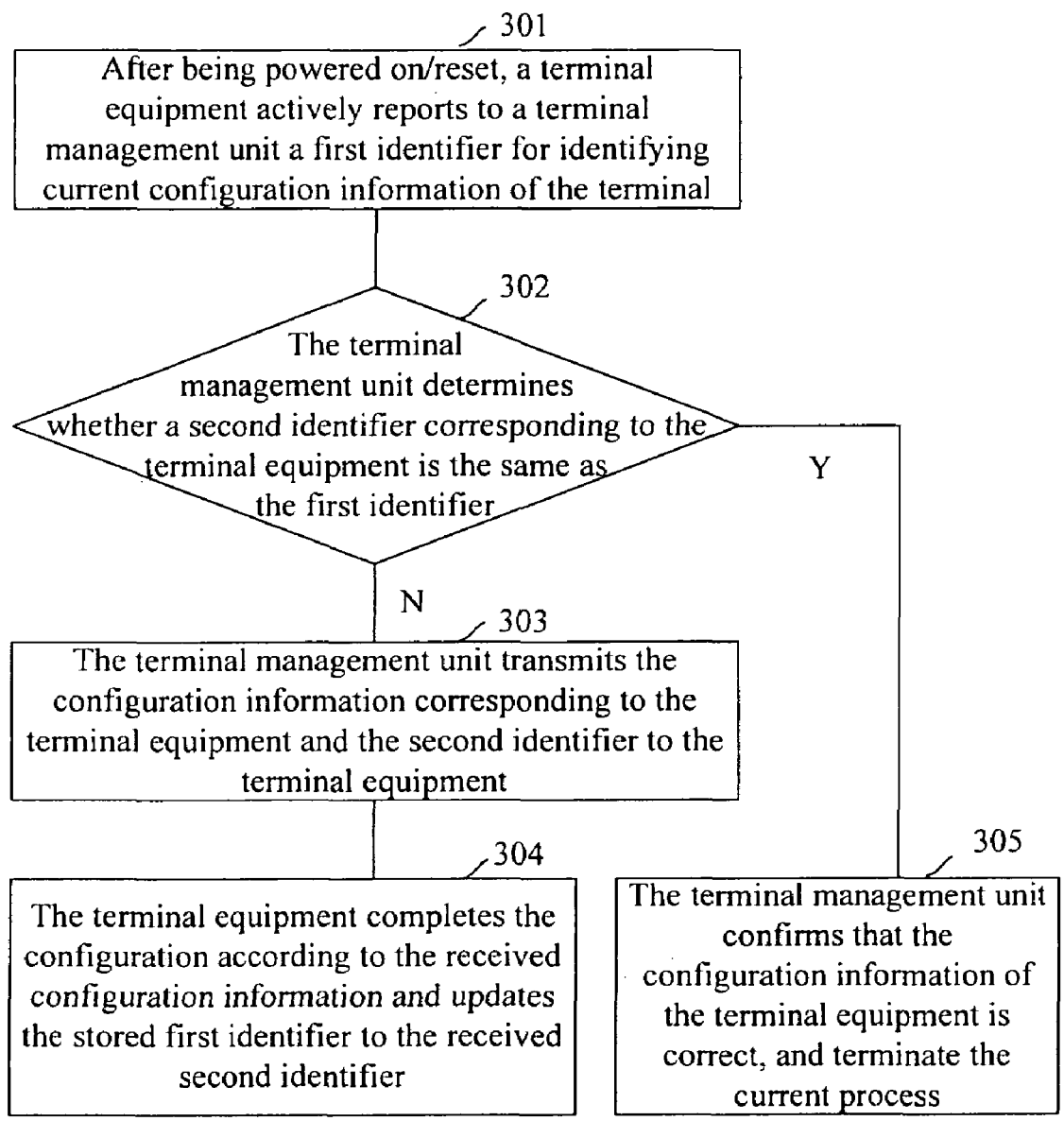
FIG. 3 is a flowchart in accordance with the embodiment of the invention.

Based on the above settings and taking the case that the terminal management unit sends the second identifier to the terminal equipment for example, the implementing procedure in accordance with the embodiment of the present invention is shown in FIG. 3, including the following steps.

Step 301: after being powered on or reset, a terminal equipment actively reports a first identifier used for identifying current configuration information in the terminal equipment to a terminal management unit.

Step 302: the terminal management unit finds out a second identifier corresponding to the terminal equipment from stored information, and compares the second identifier with the first identifier reported by the terminal equipment; if the two identifiers are different, proceeds to step 303; otherwise, proceeds to step 305.

If the terminal management unit configures all terminal equipment with the same configuration information and the same second identifier, the terminal management unit can directly obtain the second identifier.

If the terminal management unit respectively configures different second identifier for each terminal equipment, the second identifier and the terminal equipment identifier are stored together and the corresponding second identifier can be found through the terminal equipment identifier. The terminal equipment identifier, which is used for identifying the information of the terminal equipment, can be an address or a name/ID.

Step 303: the terminal management unit transmits the configuration information corresponding to the terminal equipment and the second identifier to the terminal equipment.

The configuration information can be transmitted to the terminal equipment by means of a configuration file or through a batch command.

Step 304: the terminal equipment completes the configuration according to the received configuration information and updates the stored first identifier according to the second identifier.

Step 305: the terminal management unit confirms that the configuration information of the terminal equipment is correct and then terminates the current processing procedure.

The terminal equipment can be configured through the above-mentioned steps.

In order to make sure that the configuration information in the terminal equipment is only allocated by the terminal management unit, as to the solution that adopts the first identifier and the second identifier, it is necessary for the terminal equipment to reset the first identifier as the initial value after the configuration information in the terminal equipment is modified by equipment other than the terminal management unit. In this way, when the terminal equipment executes the process shown in FIG. 3 after being powered on or reset, the terminal management unit can reset the configuration in the terminal equipment. Because the terminal equipment will generally receive the configuration information from the terminal management unit through a specific port, if the terminal equipment receives the configuration information through a port other than the specific port or from equipment other than the terminal management unit, it can be confirmed that the configuration information in the terminal equipment is modified by the equipment other than the terminal management unit.

As illustrated above, according to the embodiment of the present invention, configuration information can be set for all terminal equipment, or corresponding configuration information can be set for each terminal equipment. If the configuration information is set for all terminal equipment, individual configuration according to the demands of the terminal equipment cannot be performed; if corresponding configuration information is set for each terminal equipment respectively, the terminal management unit has to store a large amount of information. As to the user, the terminal equipment of a same type of users often demand the same configuration, so there is no need to configure each terminal equipment one by one.

Therefore, the following improved solution, which mainly improves the above-mentioned solution of allocating the configuration information, is put forward.

In order to uniformly manage the terminal equipment of the same type of users, the users are classified firstly, e.g. classifying the users into common users, internet bar users, office users and so on. The same configuration information is allocated for the terminal equipment of the same type of users; what's more, the mapping relationship between the terminal equipment and the allocated configuration information is stored.

The step of allocating corresponding configuration information for terminal equipment of each type of users can be implemented by establishing a corresponding configuration template for the terminal equipment of each type of users; the configuration information, which is required to enable the services for the terminal equipment of the type of users, is stored in the configuration template. The configuration template can be stored in the physical entity, in which the terminal management unit is running, in the form of a database or a file, or be stored in other physical entities that the terminal management unit can access.

After the configuration template is set, it is still necessary to specify a corresponding configuration template for each terminal equipment, i.e. to set up the mapping relationship between the terminal equipment and the configuration template. The mapping relationship can be stored in a file or in a database. Since the terminal equipment itself has an identifier, which can be an address, a name/ID and so on, after a template identifier is set for each configuration template, the mapping relationship between the terminal equipment and the configuration template can be represented by the mapping relationship from the terminal equipment identifier to the configuration template identifier.

For the convenience of comparing, a second identifier corresponding to each terminal equipment can be set in the terminal management unit; the second identifier corresponding to the terminal equipment identifies the configuration information corresponding to the terminal equipment in the terminal management unit; and a first identifier can be set in the terminal equipment for identifying the configuration information in the terminal equipment. As illustrated above, the identifiers can be obtained by calculating the configuration information. Similarly, the second identifier in the terminal management unit can be stored respectively for each terminal equipment, i.e. the terminal management unit can store the corresponding second identifier while storing the mapping relationship between the terminal equipment and the configuration template, so that the terminal management unit can also directly obtain the corresponding second identifier according to the identifier of the terminal equipment; alternately, a second identifier can be stored for all terminal equipment. It is also applicable to set a second identifier for each type of terminal equipment, in such case, the second identifier can be stored in the corresponding configuration template, i.e. the corresponding terminal equipment of the configuration template utilizes the same second identifier, thus the terminal management unit needs to obtain the corresponding second identifier from the configuration template.

After setting up the configuration template and the mapping relationship between the terminal equipment and the configuration template, if the terminal management unit determines that the first identifier in the terminal equipment is different from the second identifier corresponding to the terminal equipment, the terminal management unit can determine the corresponding configuration template according to the identifier of the terminal equipment and the stored mapping relationship, and then send the configuration information in the configuration template to the terminal equipment; correspondingly, the terminal equipment can update its configuration information according to the received configuration information.

To sum up, the above description is only preferred embodiments of the invention and is not to be construed as limiting the protection scope thereof. Any changes and modifications can be made by those skilled in the art without departing from the spirit of the present invention and therefore shall be covered in the protection scope as set up by the appended claims.

What is claimed is:

1. A method for automatically configuring terminal equipment, wherein a terminal management unit provides the terminal equipment with configuration information, comprising:
   after being powered on/reset, the terminal equipment reporting the current configuration information to the terminal management unit;
   the terminal management unit determining whether the configuration information reported by the terminal equipment is the same as the configuration information for the terminal equipment stored in the terminal management unit, if the configuration information reported by the terminal equipment is the same as the configuration information for the terminal equipment stored in the terminal management unit, terminating the current process, otherwise, transmitting the configuration information for the terminal equipment stored in the terminal management unit to the terminal equipment;
   the terminal equipment updating its own configuration information according to the received configuration information.

2. The method according to claim 1, wherein the terminal management unit providing the terminal equipment with the configuration information comprises:
   providing all terminal equipment with the same configuration information;
   the step of the terminal management unit transmitting the configuration information for the terminal equipment stored in the terminal management unit to the terminal equipment comprises:
   directly transmitting the configuration information for the terminal equipment stored in the terminal management unit to the terminal equipment.

3. The method according to claim 2, further comprising:
   presetting in each terminal equipment a first identifier, used for identifying the configuration information in the terminal equipment, and setting in the terminal management unit a second identifier for each terminal equipment to identify the configuration information needed by the terminal equipment; wherein
   the step of the terminal equipment transmitting current configuration information to the terminal management unit comprises:
   transmitting the first identifier stored in the terminal equipment to the terminal management unit;
   the step of the terminal management unit determining whether the configuration information reported by the terminal equipment is the same as the configuration information for the terminal equipment stored in the terminal management unit comprises:
   determining whether the first identifier reported by the terminal equipment is the same as the second identifier for the terminal equipment stored in the terminal management unit;
   the method, after confirming that the configuration information reported by the terminal equipment is different from the configuration information for the terminal equipment stored in the terminal management unit, further comprises:
   unifying the second identifier for the terminal equipment in the terminal management unit and the first identifier in the terminal equipment.

4. The method according to claim 3, wherein, the step of setting the second identifier for the terminal equipment in the terminal management unit comprises:
   respectively setting a second identifier for each terminal equipment;
   the step of unifying the second identifier for the terminal equipment in the terminal management unit and the first identifier in the terminal equipment comprises:
   the terminal management unit updating the second identifier for the terminal equipment in the terminal management unit according to the first identifier reported by the terminal equipment; or
   the terminal equipment obtaining a new first identifier according to the received configuration information and transmitting the new first identifier to the terminal management unit; the terminal management unit updating the second identifier for the terminal equipment in the terminal management unit according to the new first identifier reported by the terminal equipment.

5. The method according to claim 3, wherein, the step of setting a second identifier for each terminal equipment in the terminal management unit comprises:
   respectively setting a second identifier for each terminal equipment; or
   setting the same second identifier for all terminal equipment;
   the method, after the terminal management unit confirming that the first identifier reported by the terminal equipment is different from the second identifier for the terminal equipment in the terminal management unit, further comprises:
   transmitting the second identifier for the terminal equipment to the terminal equipment;

the step of unifying the second identifier for the terminal equipment in the terminal management unit and the first identifier in the terminal equipment comprises:

the terminal equipment updating the first identifier in the terminal equipment according to the received second identifier.

6. The method according to claim 3, further comprising:

after confirming that the configuration information of the terminal equipment has been modified by any equipment other than the terminal management unit, the terminal equipment resetting its first identifier as an initial value.

7. The method according to claim 1, wherein, the terminal management unit providing the terminal equipment with the configuration information comprises:

respectively providing each terminal equipment with corresponding configuration information and storing the mapping relationship between each terminal equipment and the corresponding configuration information;

the step of the terminal management unit transmitting the configuration information for the terminal equipment stored in the terminal management unit to the terminal equipment comprises:

determining the corresponding configuration information of the terminal equipment and transmitting the configuration information to the terminal equipment.

8. The method according to claim 7, further comprising:

presetting in each terminal equipment a first identifier, used for identifying the configuration information in the terminal equipment, and setting in the terminal management unit a second identifier for each terminal equipment to identify the configuration information needed by the terminal equipment; wherein the step of the terminal equipment transmitting current configuration information to the terminal management unit comprises:

transmitting the first identifier stored in the terminal equipment to the terminal management unit;

the step of the terminal management unit determining whether the configuration information reported by the terminal equipment is the same as the configuration information for the terminal equipment stored in the terminal management unit comprises:

determining whether the first identifier reported by the terminal equipment is the same as the second identifier for the terminal equipment stored in the terminal management unit;

the method, after confirming that the configuration information reported by the terminal equipment is different from the configuration information for the terminal equipment stored in the terminal management unit, further comprises:

unifying the second identifier for the terminal equipment in the terminal management unit and the first identifier in the terminal equipment.

9. The method according to claim 8, wherein, the step of setting the second identifier for the terminal equipment in the terminal management unit comprises:

respectively setting a second identifier for each terminal equipment;

the step of unifying the second identifier for the terminal equipment in the terminal management unit and the first identifier in the terminal equipment comprises:

the terminal management unit updating the second identifier for the terminal equipment in the terminal management unit according to the first identifier reported by the terminal equipment; or the terminal equipment obtaining a new first identifier according to the received configuration information and transmitting the new first identifier to the terminal management unit; the terminal management unit updating the second identifier for the terminal equipment in the terminal management unit according to the new first identifier reported by the terminal equipment.

10. The method according to claim 8, wherein, the step of setting a second identifier for each terminal equipment in the terminal management unit comprises:

respectively setting a second identifier for each terminal equipment; or setting the same second identifier for all terminal equipment;

the method, after the terminal management unit confirming that the first identifier reported by the terminal equipment is different from the second identifier for the terminal equipment in the terminal management unit, further comprises:

transmitting the second identifier for the terminal equipment to the terminal equipment;

the step of unifying the second identifier for the terminal equipment in the terminal management unit and the first identifier in the terminal equipment comprises:

the terminal equipment updating the first identifier in the terminal equipment according to the received second identifier.

11. The method according to claim 8, further comprising:

after confirming that the configuration information of the terminal equipment has been modified by any equipment other than the terminal management unit, the terminal equipment resetting its first identifier as an initial value.

12. The method according to claim 1, further comprising:

classifying the terminal equipment into at least one class according to the user of the equipment; wherein the terminal management unit providing the terminal equipment with the configuration information comprises:

allocating the same configuration information for each class of terminal equipment;

the step of the terminal management unit transmitting the configuration information for the terminal equipment stored in the terminal management unit to the terminal equipment comprises:

determining the corresponding configuration information of the class that the terminal equipment belongs to and then transmitting the configuration information to the terminal equipment.

13. The method according to claim 12, wherein, the step of allocating the same configuration information for each class of terminal equipment comprises:

allocating a configuration template for each class of terminal equipment, storing the configuration information of each class of terminal equipment in the corresponding configuration template and storing the mapping relationship between the terminal equipment and the configuration template.

14. The method according to claim 12, further comprising:

presetting in each terminal equipment a first identifier, used for identifying the configuration information in the terminal equipment, and setting in the terminal management unit a second identifier for each terminal equipment to identify the configuration information needed by the terminal equipment; wherein the step of the terminal equipment transmitting current configuration information to the terminal management unit comprises:

transmitting the first identifier stored in the terminal equipment to the terminal management unit;

the step of the terminal management unit determining whether the configuration information reported by the terminal equipment is the same as the configuration information for the terminal equipment stored in the terminal management unit comprises:

determining whether the first identifier reported by the terminal equipment is the same as the second identifier for the terminal equipment stored in the terminal management unit;

the method, after confirming that the configuration information reported by the terminal equipment is different from the configuration information for the terminal equipment stored in the terminal management unit, further comprises:

unifying the second identifier for the terminal equipment in the terminal management unit and the first identifier in the terminal equipment.

15. The method according to claim 14, wherein, the step of setting the second identifier for the terminal equipment in the terminal management unit comprises:

respectively setting a second identifier for each terminal equipment;

the step of unifying the second identifier for the terminal equipment in the terminal management unit and the first identifier in the terminal equipment comprises:

the terminal management unit updating the second identifier for the terminal equipment in the terminal management unit according to the first identifier reported by the terminal equipment; or the terminal equipment obtaining a new first identifier according to the received configuration information and transmitting the new first identifier to the terminal management unit; the terminal management unit updating the second identifier for the terminal equipment in the terminal management unit according to the new first identifier reported by the terminal equipment.

16. The method according to claim 14, wherein, the step of setting a second identifier for each terminal equipment in the terminal management unit comprises:

respectively setting a second identifier for each terminal equipment; or setting the same second identifier for all terminal equipment;

the method, after the terminal management unit confirming that the first identifier reported by the terminal equipment is different from the second identifier for the terminal equipment in the terminal management unit, further comprises:

transmitting the second identifier for the terminal equipment to the terminal equipment;

the step of unifying the second identifier for the terminal equipment in the terminal management unit and the first identifier in the terminal equipment comprises:

the terminal equipment updating the first identifier in the terminal equipment according to the received second identifier.

17. The method according to claim 14, further comprising:

after confirming that the configuration information of the terminal equipment has been modified by any equipment other than the terminal management unit, the terminal equipment resetting its first identifier as an initial value.

18. The method according to claim 1, further comprising:

presetting in each terminal equipment a first identifier, used for identifying the configuration information in the terminal equipment, and setting in the terminal management unit a second identifier for each terminal equipment to identify the configuration information needed by the terminal equipment; wherein the step of the terminal equipment transmitting current configuration information to the terminal management unit comprises:

transmitting the first identifier stored in the terminal equipment to the terminal management unit;

the step of the terminal management unit determining whether the configuration information reported by the terminal equipment is the same as the configuration information for the terminal equipment stored in the terminal management unit comprises:

determining whether the first identifier reported by the terminal equipment is the same as the second identifier for the terminal equipment stored in the terminal management unit;

the method, after confirming that the configuration information reported by the terminal equipment is different from the configuration information for the terminal equipment stored in the terminal management unit, further comprises:

unifying the second identifier for the terminal equipment in the terminal management unit and the first identifier in the terminal equipment.

19. The method according to claim 18, wherein, the step of setting the second identifier for the terminal equipment in the terminal management unit comprises:

respectively setting a second identifier for each terminal equipment;

the step of unifying the second identifier for the terminal equipment in the terminal management unit and the first identifier in the terminal equipment comprises:

the terminal management unit updating the second identifier for the terminal equipment in the terminal management unit according to the first identifier reported by the terminal equipment; or the terminal equipment obtaining a new first identifier according to the received configuration information and transmitting the new first identifier to the terminal management unit; the terminal management unit updating the second identifier for the terminal equipment in the terminal management unit according to the new first identifier reported by the terminal equipment.

20. The method according to claim 18, wherein, the step of setting a second identifier for each terminal equipment in the terminal management unit comprises:

respectively setting a second identifier for each terminal equipment; or setting the same second identifier for all terminal equipment;

the method, after the terminal management unit confirming that the first identifier reported by the terminal equipment is different from the second identifier for the terminal equipment in the terminal management unit, further comprises:

transmitting the second identifier for the terminal equipment to the terminal equipment;

the step of unifying the second identifier for the terminal equipment in the terminal management unit and the first identifier in the terminal equipment comprises:

the terminal equipment updating the first identifier in the terminal equipment according to the received second identifier.

21. The method according to claim 18, further comprising:

after confirming that the configuration information of the terminal equipment has been modified by any equipment other than the terminal management unit, the terminal equipment resetting its first identifier as an initial value.

22. The method according to claim 1, wherein, the step of the terminal management unit transmitting the configuration information to the terminal equipment comprises:

transmitting the configuration information to the terminal equipment through a configuration file or a batch command.

* * * * *

UNITED STATES PATENT AND TRADEMARK OFFICE
CERTIFICATE OF CORRECTION

| | | |
|---|---|---|
| PATENT NO. | : 7,620,060 B2 | Page 1 of 1 |
| APPLICATION NO. | : 11/544096 | |
| DATED | : November 17, 2009 | |
| INVENTOR(S) | : Jie Li | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 632 days.

Signed and Sealed this

Twenty-sixth Day of October, 2010

David J. Kappos
*Director of the United States Patent and Trademark Office*